United States Patent
Roth

(10) Patent No.: US 6,623,704 B1
(45) Date of Patent: Sep. 23, 2003

(54) APPARATUS AND METHOD FOR MANUFACTURING A CATALYTIC CONVERTER

(75) Inventor: Gregory Thomas Roth, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/510,945

(22) Filed: Feb. 22, 2000

(51) Int. Cl.⁷ .................. B01D 50/00; B01D 53/34; B21D 51/16
(52) U.S. Cl. ............ 422/179; 422/177; 422/180; 29/890
(58) Field of Search .................. 422/168–183; 502/527.19, 527.23; 423/212, 213.2; 60/272, 299–302

(56) References Cited

U.S. PATENT DOCUMENTS

| | | | | |
|---|---|---|---|---|
| 5,055,274 A | * | 10/1991 | Abbott | 422/171 |
| 5,494,881 A | * | 2/1996 | Machida et al. | 502/439 |
| 5,693,295 A | * | 12/1997 | Foster | 422/180 |
| 5,882,608 A | * | 3/1999 | Sanocki et al. | 422/179 |
| 6,155,044 A | * | 12/2000 | Kaiho et al. | 60/297 |

* cited by examiner

Primary Examiner—Glenn Caldarola
Assistant Examiner—Douglas W. Rudnick
(74) Attorney, Agent, or Firm—Jimmy L. Funke

(57) ABSTRACT

An exemplary embodiment of the present invention is a method for manufacturing a catalytic converter. A plurality of catalyst substrates having a periphery, an intake area and an outlet area, and comprising a catalyst, is longitudinally aligned. A mat support material is wrapped about the periphery of the catalyst substrates to form a subassembly. The subassembly is concentrically disposed within a shell. The shell is formed to have a non-linear geometry.

17 Claims, 2 Drawing Sheets

APPARATUS AND METHOD FOR MANUFACTURING A CATALYTIC CONVERTER

TECHNICAL FIELD

This invention relates to an apparatus and method for manufacturing a catalytic converter.

BACKGROUND OF THE INVENTION

Catalytic converters are devices incorporated into an automobile's exhaust system that reduce the amount of pollutants found in exhaust gases to environmentally harmless levels. A catalytic converter may be placed anywhere in the exhaust system. However, it is advantageous to locate a catalytic converter as close as possible to the combustion chamber in an engine compartment. Placing a catalytic converter closer to the combustion chamber quickens the converter's light-off time. The light-off time is the point at which the catalyst reaches fifty percent efficiency over a period of time (measured in seconds) during start-up of the automobile.

Placing catalytic converters into an engine compartment creates additional packaging constraints. "Packaging constraints" is an industrial term referring to the question, "how do we fit a part in a vehicle?", taking into consideration the space and volume of the area of interest, including the parts nearby and the interaction of those parts.

Accordingly, a need exists for an apparatus and method for manufacturing a catalytic converter that can meet both emissions requirements and packaging constraints.

SUMMARY OF THE INVENTION

The drawbacks and disadvantages of the prior art are overcome by the catalytic converter of the present invention and its method of manufacture and use. The catalytic converter, comprises: a plurality of longitudinally aligned catalyst substrates each having a periphery, an intake area and an outlet area and comprising a catalyst, wherein said outlet area of one of said catalyst substrates is substantially aligned in series an intake area of a subsequent catalyst substrate; a mat support material wrapped concentrically around said periphery of said catalyst substrates to form a subassembly; a shell concentrically disposed around said subassembly, said shell having at least one bend such that said shell is configured in a non-linear geometry.

The method for manufacturing the catalytic converter, comprises: longitudinally aligning a plurality of catalyst substrates having a periphery, an intake area and an outlet area, said catalyst substrates comprising a catalyst; wrapping a mat support material about said periphery of said catalyst substrates to form a subassembly; disposing said subassembly concentrically within a shell; and forming said shell into a non-linear geometry.

A method of purifying an exhaust stream; comprising: using a catalytic converter comprising a plurality of longitudinally aligned catalyst substrates each having a periphery, an intake area and an outlet area and comprising a catalyst, wherein said outlet area of one of said catalyst substrates is in fluid communication with an intake area of a subsequent catalyst substrate, a mat support material wrapped concentrically around said periphery of said catalyst substrates to form a subassembly; a shell concentrically disposed around said subassembly, said shell having at least one bend such that said shell is configured in a non-linear geometry; introducing an exhaust stream to said catalytic converter, wherein said exhaust stream passes from an outlet of one of said catalyst substrates to an intake area of a subsequent catalyst substrate; and catalyzing contaminants in said exhaust stream.

The above-described and other features and advantages of the present invention will be appreciated and understood by those skilled in the art from the following detailed description, drawings, and appended claims.

BRIEF DESCRIPTION OF THE DRAWINGS

For a further understanding of the nature of the present invention, as well as other features and advantages thereof, reference should be made to the following detailed description taken in conjunction with the accompanying drawings, which are meant to be exemplary, not limiting, and wherein.

DETAILED DESCRIPTION OF THE PREFERRED EMBODIMENTS

The present invention is an apparatus and method for assembling a catalytic converter that can meet the packaging constraints in an automobile engine compartment. This catalytic converter can be a bent pipe assembly containing integral catalytic converter components.

Figure 1:
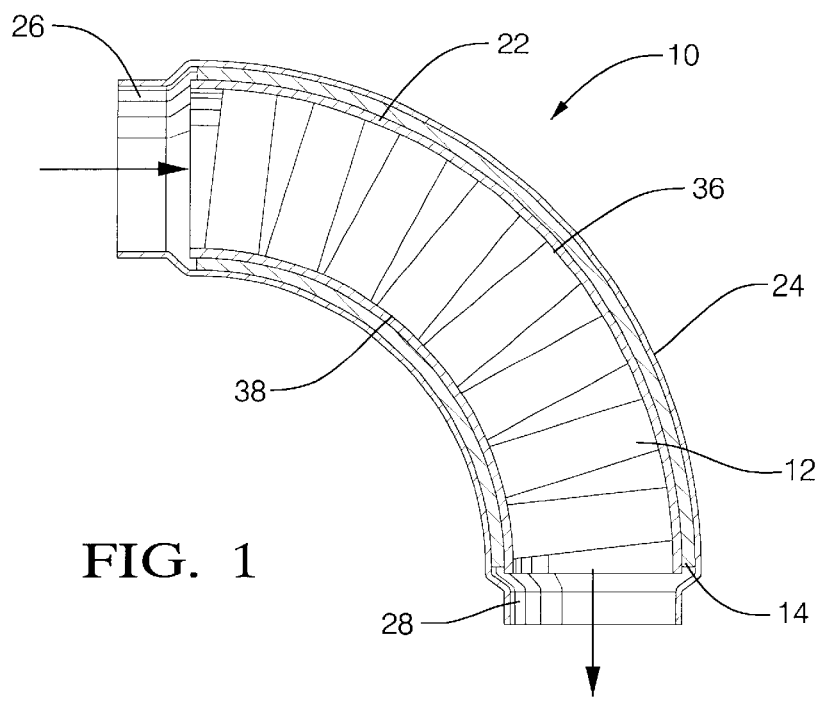
FIG. 1 is a cross-sectional view of one embodiment of a catalytic converter of the present invention.

Referring now to FIG. 1, a prospective example of a catalytic converter 10 is illustrated. Catalytic converter 10 contains a plurality of catalyst substrate 12 disposed within a mat support material 14. Catalyst substrate 12 comprises any material or "high temperature materials" capable of operating under exhaust system conditions, that is, temperatures up to about 1,000° C. and exposure to hydrocarbons, nitrous oxides, carbon monoxide, carbon dioxide, and/or sulfur, in for instance, a spark ignition or diesel engine environment. High temperature materials, such as ceramic, metallic foils, combinations thereof, and other materials, with ceramics typically preferred, that are capable of supporting the desired catalyst coating. Some possible ceramic materials include cordierite, silicon carbide, and the like, and mixtures thereof. Two such materials are "Honey Ceram" commercially available from NGK-Locke, Inc, in Southfield, Mich., and, "Cordierite", which is commercially available from Coming, Inc., Corning, N.Y.

Plurality of catalyst substrate 12 will comprise several pieces of catalyst substrate material embodying the above-mentioned features including composition, high temperature materials, operating temperature ranges, catalyst material(s), surface area and ability to catalyze exhaust gases. These pieces of catalyst substrate 12 may have shapes such as circular, oblong, oval, disks or shapes comprising more than two sides, e.g., triangular, rectangular, pentagonal, hexagonal, and the like. Plurality of substrates 12 require a shape to substantially fill the volume of a bent pipe shaped shell 24; substrates 12 may preferably have a disk or truncated triangle geometry to substantially fill the volume of shell 24.

Catalyst substrate 12 can have any geometry for its inner surface that provides a sufficient area for the catalyst but is also preferably configured with a honeycomb structure. The honeycomb may have cells shaped like triangles, squares, rectangles, octagonals, hexagonals, diamonds and the like. In consideration of the tooling costs for extrusion molding or the like, however, the cells are generally square in shape. Catalyst substrate 12 will preferably have the greatest number of cells that is structurally feasible so that the inner surface area of catalyst substrate 12 is maximized. The surface area of substrate 12 should also be sufficient to support a sufficient amount of catalyst(s) to effectively catalyze exhaust gas streams flowing therethrough, with the surface area being a function of the surface design of gas passages, the volume of the substrate, and the effective density of the substrate. These parameters may be adjusted according to the design needs, taking into account both the desired shape of the catalytic converter and optimal paths for exhaust gas flow.

Plurality of catalyst substrates 12 are formed to provide a great number of gas passages comprising appropriate catalyst material(s). Catalyst substrate 12 may be wash coated and/or imbibed with a catalyst, which may comprise a high surface area material, having one or more possible catalyst materials including noble metals such as platinum, palladium, rhodium, iridium, osmium and ruthenium; and other metals such as tantalum, zirconium, yttrium, cerium, nickel, and copper; and mixtures and alloys thereof, and other conventional catalysts.

Disposed around and concentric with catalyst substrate 12 is a mat support material 14 which provides support to substrate 12 during operation of the catalytic converter. Mat support material 14 may be any material capable of insulating catalyst substrate 12 and preferably capable of holding the substrate in the desired location while being inserted into a shell. Mat support material 14 can be a formed fibrous material containing vermiculite, refractory ceramic fibers, organic binders, combinations thereof and other conventional materials. Mat support material 14 can either be a simple non-expanding ceramic material, or an intumescent material, e.g., one which contains a vermiculite component that expands with heating to maintain firm compression when the outer steel expands outward from the catalyst substrate, as well as material which include a combination of both. Typical non-expanding ceramic fiber materials include ceramic materials such as those sold under the trademarks "NEXTEL" and "SAFFIL" by the "3M" Company, Minneapolis, Minn., or those sold under the trademark, "FIBERFRAX" and "CC-MAX" by the Unifrax Co., Niagara Falls, N.Y., and the like. Some of the typical intumescent ceramic material include ceramic materials such as those sold under the trademark "INTERAM" by the "3M" Company, Minneapolis, Minn., as well as those intumescents which are also sold under the aforementioned "FIBERFRAX" trademark, as well as combinations thereof and others.

The thickness of mat support material 14 will be dependent upon the temperature of the exhaust gas and the catalytic converter's application. For instance, the catalytic converter for a spark ignition environment will require a mat support material having a thickness that differs from the catalytic converter operating in a diesel environment. As the exhaust gas temperature range increases, the thickness of mat support material 14 typically increases accordingly to meet customer skin temperature requirements. Generally, the mat support material thickness is about 2 mm to 12 mm preferred for most automotive applications. Additionally, the peripheral dimensions of each catalyst substrate 12 and customer skin temperature requirements will determine the preferred length and width of mat support material 10.

Figure 2:
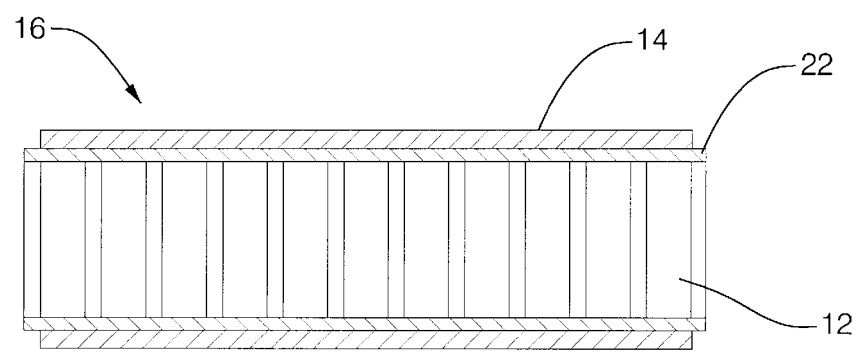
FIG. 2 is a cross-sectional view of one embodiment of a subassembly for a catalytic converter of the present invention.
Figure 3:
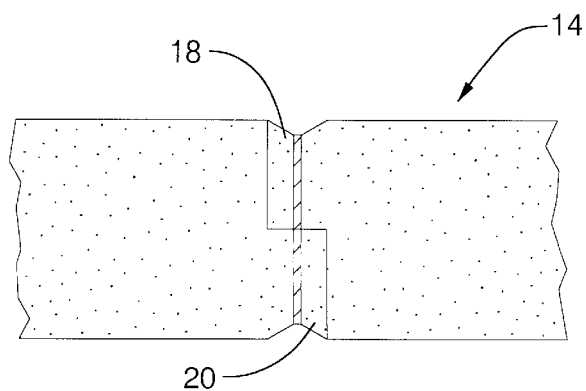
FIG. 3 is a view of one embodiment of a mat support material for a catalytic converter of the present invention.

Referring now to FIGS. 2 and 3, catalyst substrates 12 can be wrapped one or more times with mat support material 14 to create a mat support/substrate subassembly 16 (FIG. 2). A pair of edges 18, 20 of mat support material 14 can be temporarily fastened together, or otherwise bound, so that mat support material 14 fits about catalyst substrates 12 (FIG. 3). Edges 18, 20 of mat support material 14 may be fastened together about catalyst substrate 12 by creating a joint design, e.g. a dado joint, using a die cut mat and fastening edges 18, 20 by gluing, stapling, taping or any other means which will preferably wrap catalyst substrates 12 sufficiently snug to hold catalyst substrates 12 in place without significantly and adversely effecting the structural integrity of the substrates. Additionally, a foil wrap 22 comprising stainless steel, or other material capable of withstanding temperatures, may optionally be wrapped, e.g. in a spiral pattern, around catalyst substrate 12 prior to wrapping catalyst substrate 12 with mat support material 14. Foil 22 can be utilized to prevent mat erosion in the unsupported areas between catalyst substrate 12 that are created by the subsequent bending and/or forming operation. Foil 22 can also protect mat support material 14 from exposure to high speed exhaust gas flow that can erode mat support material 14. Once subassembly 16 has been assembled with or without foil 22, subassembly 16 will then be inserted into a pipe 24 with or without the use of a stuffing cone.

The stuffing cone is a device that will compress mat support material 14 about each catalyst substrate 12 as subassembly 16 passes through the cone. The pressure placed on mat support material 14 and catalyst substrates 12 during stuffing or subsequent forming of pipe 24 will be sufficient to hold each catalyst substrate 12 in place. The pressure may also ensure that catalyst substrates 12 are sufficiently insulated from shock and mechanical stress that is typically experienced during operation of the catalytic converter.

Figure 4:
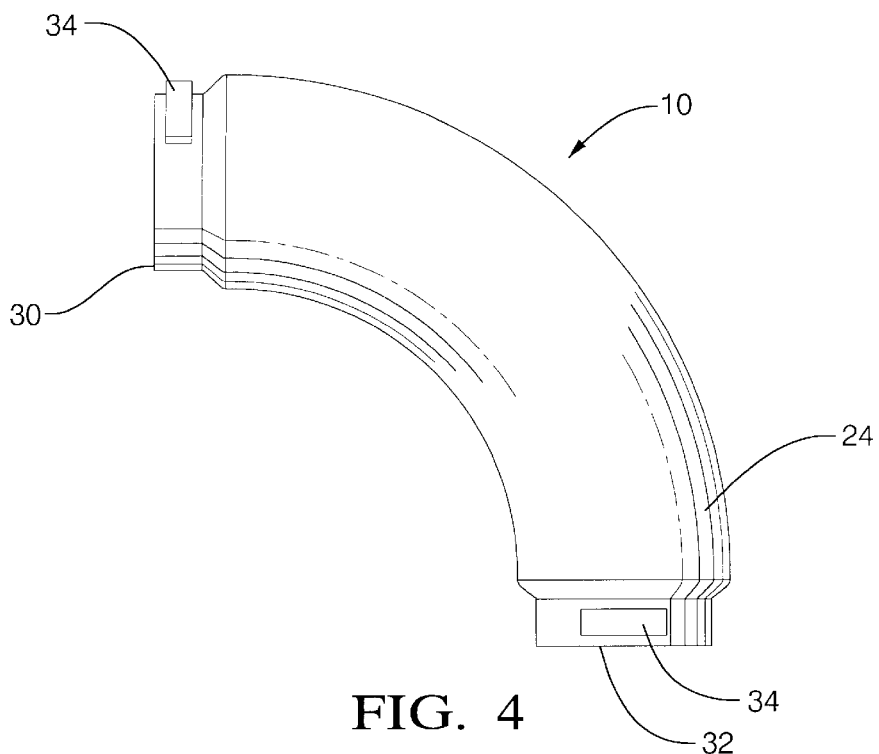
FIG. 4 is an isometric view of another embodiment of a catalytic converter shown in FIG. 1.
Figure 5:
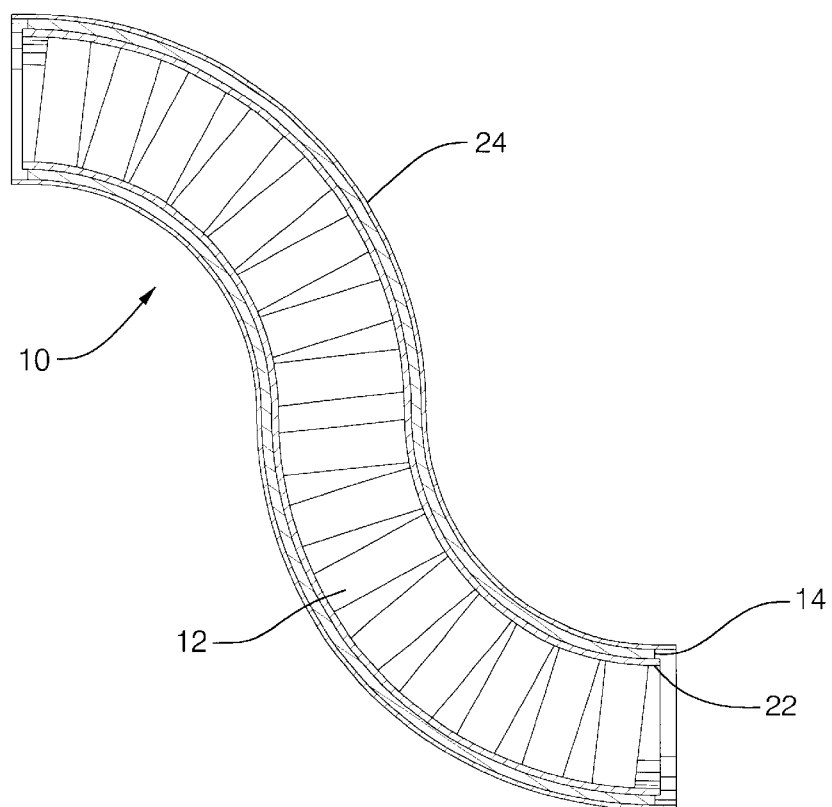
FIG. 5 is a cross-sectional view of another embodiment of a catalytic converter of the present invention.

Referring now to FIGS. 1, 4 and 5, pipe 24 can be any geometry which meets the packaging constraints, for example, a cylindrical tube, sleeve, or even a bent cylinder as in elbow-like, sinusoidal, or the like, of metal can be employed. Pipe 24 can incorporate different design profiles such as an oval tube or sleeve, so long as the design can meet the specified dimensions and tolerances making pipe 24 conducive to bending and meeting both packaging constraints and emissions requirements. Pipe 24 will have an intake opening 26 and an outlet opening 28. Exhaust gases will enter intake opening 26 and pass through each catalyst substrate 12, while being catalytically treated, before exiting at outlet opening 28 (FIG. 1). Both intake opening 26 and outlet opening 28 may be sized or form fitted to create a fitted intake opening 30 and a fitted outlet opening 32 so that catalytic converter 10 may be attached to an automobile's exhaust system components (FIG. 4).

Additionally, pipe 24 may also have at least one sensor 34, such as a temperature sensor or an oxygen sensor, mounted to its exterior surface, including intake opening 26 and/or outlet opening 28 as well as fitted intake opening 30 and/or fitted outlet opening 32 (FIG. 4). Pipe 24 could also include more than one bend to meet specific packaging constraints (FIG. 5). The bends in pipe 24 are not limited to co-planar geometries and, accordingly, three dimensional forms and shapes may be crafted and utilized as well. However, as pipe 24 bends more than once, material stress to pipe 24 needs to be minimized to maintain the structural integrity of pipe 24.

Suitable materials for pipe 24 comprise any material which is capable of resisting under-car salt, temperature and corrosion; ferritic materials, such as, stainless steels including grades SS-409, SS-439, and SS-441, are however, generally preferred. The choice of material depends upon the type of exhaust gas, the maximum temperature of the gas and catalyst substrate, and the like. Acceptable SS type stainless steel include stainless steels such as those sold under the trademarks "Type S40900" by Armco, Inc., in Pittsburgh, Pa.

To complete the manufacturing process of catalytic converter 10, pipe 24 can be bent according to the design specifications; pipe 24 can also be modeled after the existing packaging constraints. Pipe 24 can be first compressed about the mat support/substrate subassembly and then bent to form a single bend in pipe 24. Alternatively, pipe 24 may also be simultaneously bent and compressed about the mat support/substrate subassembly to form a single bend in pipe 24. Either technique can cause pipe 24 to stretch in length depending upon the material of pipe 24, the number of bends incorporated in the design, and the amount of compressive force pipe 24 undergoes during forming the bend or bends. Compressing pipe 24 further ensures that each catalyst substrate 12 will be held in place during the lifetime of catalytic converter 10. The compressive force experienced by mat support material 14 of the intumescent or non-intumescent variety will create a uniform mat density up to about 1.00 grams per cubic centimeter ($g/cm^3$), within a range of about 0.50 grams per cubic centimeter to 1.50 grams per cubic centimeter. Mat support material 14 provides a compressive load against each catalyst substrate 12 to prevent them from moving and breaking during operation of catalytic converter 10. Mat support material 14 of the intumescent variety also insulates pipe 24 from high temperatures up to about 1000° C. reached by catalyst substrates 12 during operation of catalytic converter 10.

While compressing and bending pipe 24, plurality of catalyst substrates 12 will separate at an outermost radial point 36 found along the circumference of each catalyst substrate 12 while being in close proximity to one another at an innermost radial point 38 found along the circumference of each catalyst substrate 12. This separation is due to pipe 24 bending and exerting a force upon each catalyst substrate 12, which causes each catalyst substrate 12 to move. When foil 22 is disposed about subassembly 16, foil 22 will also expand and stretch as catalyst substrates 12 expand during operation of the catalytic converter.

Although catalytic converter 10 may be mounted anywhere within an automobile's exhaust system, catalytic converter 10 preferably is mounted as close as possible to the combustion chamber within the engine compartment given the packaging constraints. Catalytic converter 10 can also utilize the existing packaging area currently occupied by the exhaust pipe in an automobile's exhaust system and thereby eliminate packaging constraint concerns. This space already exists in all automotive engine compartments. Catalytic converter 10 allows dual use of the existing packaging space as an exhaust pipe and a catalytic converter. As a result, catalytic converter 10 will simplify packaging catalytic converters in automotive engine compartments.

Catalytic converter 10 may also replace a fabricated exhaust manifold that is designed to collect exhaust gas into a single tube or collection area. A fabricated exhaust manifold is typically comprised of a number of tubes, corresponding with the number of cylinders in the engine, that are bent to meet at a single point before exiting the engine compartment. Each tube of a fabricated exhaust manifold may be replaced by a catalytic converter 10. These pipe converters 10 could then converge to a single point, constituting a collection area, before exiting the engine compartment. Pipe converters 10 may also exit the engine compartment without meeting at a collection area and still remove and catalytically treat exhaust gases. This innovative design would effectively place catalytic converter 10 closer to the combustion chamber thereby decreasing the light-off time of catalytic converter 10. Another recognized advantage is that catalytic converter 10 creates a "dual use" of the space once occupied by the fabricated exhaust manifold. In such an embodiment, the catalytic converter 10 would continue to collect exhaust gas, like a fabricated exhaust manifold, as the motor vehicle operates, as well as catalytically treating the exhaust gas as it passes through converter 10.

Catalytic converter 10 provides an advantage over traditional single-wall exhaust pipes in terms of thermal management. Catalytic converter 10 also conserves heat to facilitate a quicker light off time. The design also creates downstream shields that protect other components or systems found nearby from excessive thermal exposure. These features of catalytic converter 10 constitute significant advantages over dual-wall air gap and/or internally insulated down pipes since catalytic converter 10 can provide equal thermal management abilities yet simultaneously catalytically treat exhaust gases. Catalytic converter 10 may eventually replace the use of dual-wall air gap and/or internally insulated down pipes.

Catalytic converter 10 can become a substitute part for the exhaust pipes in a motorcycle's exhaust system. Catalytic converter 10 can perform the same function in a motorcycle exhaust system as in an automobile exhaust system. Catalytic converter 10 can also be dimensioned, proportioned and positioned for use within exhaust systems for farm equipment, lawn mowers, snowmobiles, boats, generators, hybrid vehicle power plants, trucks and industrial equipment, and the like.

While the invention has been described with reference to a preferred embodiment, it will be understood by those skilled in the art that various changes may be made and equilivants may be substituted for elements thereof without departing from the scope of the invention. In addition, many modifications may be made to adapt a particular situation or material to the teachings of the invention without departing from the essential scope thereof. Therefore, it is intended that the invention may not be limited to the particular embodiment disclosed as the best mode contemplated for carrying out this invention, but that the invention will include all embodiments falling within the scope of the intended claims.

What is claimed is:

1. A method for manufacturing a catalytic converter, comprising:
   longitudinally aligning a plurality of catalyst substrates having a periphery, an intake area and an outlet area, said catalyst substrates comprising a catalyst;
   wrapping a mat support material about said periphery of said catalyst substrates to form a subassembly;
   disposing said subassembly concentrically within a shell to form a shell assembly; and
   forming said shell assembly into a non-linear geometry after said disposing.

2. The method recited in claim 1, further comprising compressing said shell around said subassembly; and forming said shell to have a fitted intake opening and a fitted outlet opening.

3. The method recited in claim 2, further comprising installing at least one sensor on at least one of said fitted intake opening or said fitted outlet opening.

4. The method recited in claim 1, wherein said non-linear geometry is non-coplanar.

5. The method recited in claim 1, wherein said outlet area of one of said catalyst substrates is in fluid communication with an intake area of a subsequent catalyst substrate.

6. The method of claim 1, wherein said forming said shell assembly includes:
   bending said shell assembly.

7. The method of claim 1, wherein said forming said shell assembly includes:
   simultaneously compressing said shell onto said subassembly and bending said shell.

8. The method of claim 1, further comprising:
   wrapping foil about said periphery of said catalyst substrates before said wrapping said mat support material.

9. The method of claim 1, wherein said shell has a linear geometry before said forming.

10. A catalytic converter, comprising:
    a plurality of longitudinally aligned catalyst substrates each having a periphery, an intake area and an outlet area and comprising a catalyst, wherein said outlet area of one of said catalyst substrates is substantially aligned in series with an intake area of a subsequent catalyst substrate;
    a mat support material wrapped concentrically around said periphery of said catalyst substrates to form a subassembly; and
    a shell concentrically disposed around said subassembly to form a shell assembly, said shell assembly being bendable to configure said shell assembly into a non-linear geometry.

11. A catalytic converter recited in claim 10, wherein said shell comprises a fitted intake opening and a fitted outlet opening to receive exhaust system components.

12. A catalytic converter recited in claim 11, further comprising at least one sensor disposed at one or more of said intake opening and said outlet opening.

13. A method for manufacturing a catalytic converter, comprising:
    wrapping support material about a plurality of catalyst substrates to form a subassembly;
    disposing said subassembly into a shell to form a shell assembly; and
    forming said shell assembly into a non-linear geometry after said disposing.

14. The method of claim 13, wherein said forming said shell assembly includes:
    bending said shell assembly.

15. The method of claim 13, wherein said forming said shell assembly includes:
    simultaneously compressing said shell onto said subassembly and bending said shell.

16. The method of claim 13, further comprising:
    wrapping foil about said catalyst substrates before said wrapping said support material.

17. The method of claim 13, wherein said shell has a linear geometry before said forming.

* * * * *